(12) United States Patent
Ohta et al.

(10) Patent No.: US 6,720,048 B2
(45) Date of Patent: Apr. 13, 2004

(54) PIPE COMPRISING ETHYLENE BASE POLYMER

(75) Inventors: Katsutoshi Ohta, Chiba (JP); Shigeru Murakami, Chiba (JP); Ryouichi Nakano, Osaka (JP)

(73) Assignees: Idemitsu Petrochemical Co., Ltd., Tokyo (JP); Kurimoto, Ltd., Osaka (JP)

(*) Notice: Subject to any disclaimer, the term of this patent is extended or adjusted under 35 U.S.C. 154(b) by 71 days.

(21) Appl. No.: 10/049,621

(22) PCT Filed: Jun. 21, 2001

(86) PCT No.: PCT/JP01/05308

§ 371 (c)(1),
(2), (4) Date: Feb. 22, 2002

(87) PCT Pub. No.: WO01/98700

PCT Pub. Date: Dec. 27, 2001

(65) Prior Publication Data

US 2002/0188086 A1 Dec. 12, 2002

(30) Foreign Application Priority Data

Jun. 22, 2000 (JP) ........................................ 2000-187161

(51) Int. Cl.⁷ ............................. F16L 9/12; B29D 23/00

(52) U.S. Cl. .................... 428/35.7; 428/36.8; 428/36.9; 138/118; 138/177; 138/DIG. 7; 526/348

(58) Field of Search ........................... 526/348; 138/118, 138/DIG. 7, 177; 428/35.7, 36.8, 36.9

(56) References Cited

U.S. PATENT DOCUMENTS

2002/0045711 A1 * 4/2002 Backman et al. ........... 525/240

FOREIGN PATENT DOCUMENTS

| JP | 9-151280 | 6/1997 |
| JP | 11-286557 | 10/1999 |
| JP | 2001-114838 | 4/2001 |

* cited by examiner

*Primary Examiner*—Roberto Rabago
(74) *Attorney, Agent, or Firm*—Oblon, Spivak, McClelland, Maier & Neustadt, P.C.

(57) ABSTRACT

The pipe of the present invention comprises an ethylene base polymer comprising ethylene and an α-olefin having 3 to 20 carbon atoms, wherein (A) a maximum value of the residual stress is 0.13 MPa or less; (B) the crystallinity is 0.630 to 0.850; (C) a gradient of the crystallinity against a thickness of the pipe is 0.465 or less; and (D) the pipe has a thickness of 5 to 50 mm. It is excellent in a durability, a rigidity and an impact resistance and suited to uses for large diameter pipes receiving a high internal pressure.

14 Claims, 1 Drawing Sheet

PIPE COMPRISING ETHYLENE BASE POLYMER

BACKGROUND OF THE INVENTION

The present invention relates to a pipe comprising an ethylene base polymer, more specifically to a pipe comprising an ethylene base polymer which is excellent in a creep characteristic (durability), a rigidity and an impact resistance and which is suited to uses for large diameter pipes receiving a high internal pressure.

RELATED ART

In recent years, ethylene base polymers are increased in use in the pipe field because of characteristics thereof such as an excellent impact resistance. The most important characteristic required to the pipes of the ethylene base polymers is to have such an excellent durability that they are not broken even under pressure exerted by gas and city water over a long period of time. However, conventional polyethylene pipes have a problem on any of a rigidity, a long-term durability and an impact resistance, and the existing situation is that particularly when they are used for large diameter pipes receiving a high internal pressure, they can not be used because of an unsatisfactory creep characteristic and are specialized in use for branch pipes having a small diameter.

Then, various proposals have been made in order to apply them to uses receiving a high internal pressure. A polyethylene resin composition for a pipe is proposed in, for example, Japanese Patent Application Laid-Open No. 57638/1986. However, this composition has the defect that it has a high density and therefore is liable to be susceptible to brittle fracture in a creep test. Further, a polyethylene-made pipe having excellent mechanical characteristics is proposed in Japanese Patent Application Laid-Open No. 301933/1996, but this has the problem that it is inferior in fluidity.

Further, a production process in which annealing conditions are specified in order to obtain a pipe having an excellent low temperature toughness is proposed in Japanese Patent Application Laid-Open No. 44219/1998, but it is not preferred in terms of heat balance to heat again an article once cooled to subject to annealing treatment and further cool it down, and a long production line is required in actual molding.

DISCLOSURE OF THE INVENTION

The present invention has been made under such circumstances, and an object thereof is to provide a pipe comprising an ethylene base polymer which is excellent in a durability, a rigidity and an impact resistance and which is suited to uses for a large diameter pipe receiving a high internal pressure.

The present inventors have repeated intensive researches in order to achieve the object described above. As a result thereof, they have found that a pipe made of an ethylene base polymer satisfying fixed ranges in four properties of (1) residual stress, (2) crystallinity, (3) gradient of the crystallinity against a thickness of the pipe and (4) a thickness of the pipe has desired physical properties and is a pipe meeting the above object. The present invention has been completed based on such knowledge.

That is, the present invention provides a pipe comprising an ethylene base polymer comprising ethylene and α-olefin having 3 to 20 carbon atoms, wherein (A) a maximum value of the residual stress is 0.13 MPa or less; (B) the crystallinity is 0.630 to 0.850; (C) a gradient of the crystallinity against a thickness of the pipe is 0.465 or less; and (D) the pipe has a thickness of 5 to 50 mm.

BEST MODE FOR CARRYING OUT THE INVENTION

The pipe of the present invention comprises an ethylene base polymer and has to have the characteristics of (A) to (D) described above.

First, in the pipe of the present invention, (A) a maximum value of the residual stress is 0.13 MPa or less, preferably 0.11 MPa or less. If the maximum value of the residual stress exceeds 0.13 MPa, the pipe is reduced in a creep characteristic, and the pipe having the desired characteristics can not be obtained.

In this respect, the residual stress means a hoop stress remaining in the pipe, and one example of the measuring methods is described in J. G. Williams and J. M. Hodgkinson, Polym. Eng. Sci., 21 (13), 822 to 828 (1981). However, this method can be applied only when a crystallinity of a polyethylene-made pipe in a thickness direction, that is, an elastic modulus is fixed. In a pipe molding method, usually employed is a method in which an external surface of a pipe is cooled by cold water in order to solidify the pipe which is extruded from a dice and stays in a molten state. However, a polyethylene resin has a low heat conductivity, so that the polyethylene resin is exposed to different heat histories in a thickness direction of the pipe. As a result thereof, a gradient of a crystallinity, that is, an elastic modulus in a thickness direction of the pipe is produced. Accordingly, the residual stress determined by the method described above does not provide an accurate value. Thus, a residual stress of the pipe in the present invention has been measured by the following method. This measuring method makes it possible to measure an accurate residual stress even if the crystallinity has a gradient in a thickness direction of the pipe.

Measuring Method for a Maximum Value of the Residual Stress

Figure 1:
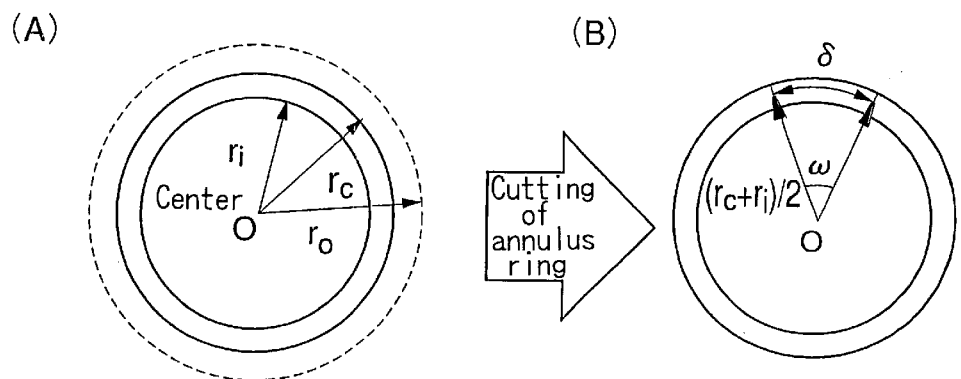
FIG. 1 is a schematic drawing for explaining a method for determining a hoop stress (a residual stress of the pipe) remaining in the pipe. (A) shows an annulus ring (length: 1 to 5 mm, width: $r_c - r_i$) after removing an external layer, and (B) shows an annulus ring (gap displacement $\delta = \omega(r_c + r_i)/2$) after deforming by cutting the annulus ring.

A pipe is cut to a length of 1 to 5 mm in the form of a ring to prepare annulus rings. In this case, if the annulus rings are distorted, the length is extended. Next, an external layer of the annulus rings is removed in a fixed width to produce five or more kinds of the annulus rings (including the annulus rings from which the external layers are not removed) having the same inner diameter and different outer diameters (refer to FIG. 1(A)). Then, the respective annulus rings are cut in a longitudinal direction of the pipe by means of a razor, and the cut face is shifted to measure a gap displacement δ (m) in an axis of the annulus rings after a fixed time t of more than 200 hours (refer to FIG. 1(B)). The case where a diameter of the annulus rings decreases is δ<0, and the case where the diameter increases is δ>0. The gap displacement δ (m) thereof is used to determine a regression coefficient $c_k$ in the following equation by a least square method:

$$\delta(\alpha_c) = \sum_{k=0}^{2} c_k \alpha_c^k \quad (1)$$

wherein $\alpha_c$ is $(r_c-r_i)/(r_o-r_i)$ ($r_c$: outer radius (m) of the annulus ring after removing the external layer; $r_i$: an inner radius (m) of the pipe; $r_o$: outer diameter (m) of the pipe; refer to FIG. 1(A)).

On the other hand, a tensile creep elastic modulus E in each part in a thickness direction of the pipe is necessary in order to determine a residual stress of the pipe, but the direct measuring method is not available. Then, the following method is used to determine the tensile creep elastic modulus E. That is, the pipe was equally divided into 6 or more parts in a thickness direction, and the respective small pieces are measured for enthalpy of fusion ΔH by means of DSC-7 (manufactured by Perkin Elmer Co., Ltd.). In DSC (differential scanning calorimeter) measurement, this small piece is put in an aluminum-made pan and maintained at 25° C. for 3 minutes, and then it is heated up to 160° C. at 10° C./minute to carry out the measurement. The ΔH is calculated with a starting point of 35° C. and an end point of 140° C. which are set as base points, and ΔH (J/g) is divided by enthalpy of fusion of 289.5 (J/g) when the crystallinity was 100% to determine a crystallinity $X_c$. A value obtained by substituting this crystallinity $X_c$ for the following equation is designated as the tensile creep elastic modulus E of each small piece after t hours. A coefficient $A_i$ (i=0 to 6) in the following equation is a value determined by a least square method finding that the dependency of the tensile creep elastic modulus on time has a correlation with a crystallinity of a polyethylene resin:

$$E(MPa) = X_c^{2.6} \sum_{i=0}^{6} A_i (\log t)^i \quad (2)$$

$A_0 = 183.848$, $A_1 = -112.732$, $A_2 = 50.625$, $A_3 = -17.552$, $A_4 = 8.607$, $A_5 = -3.263$, $A_6 = 0.465$

The tensile creep elastic modulus E of each small piece obtained by using the equation described above is used to determine a regression coefficient $a_i$ in the following equation by a least square method. Provided that $\alpha$ is $(r-r_i)/(r_o-r_i)$ and r is a distance between a central part of each small piece and a center of the annulus ring.

$$E(\alpha) = \sum_{i=0}^{3} a_i \alpha^i \quad (3)$$

In this respect, the following equation is set up in a hoop stress (that is, a residual stress in a circumferential direction) σ θ remaining in the pipe:

$$\int_0^{\alpha_c} \sigma_\theta \alpha d\alpha - \left(\frac{\alpha_c}{2} - I(\alpha_c)\right) \int_0^{\alpha_c} \sigma_\theta d\alpha = \frac{\delta(\alpha_c)}{2\pi r_i A} \frac{2}{\alpha_c A + 2} \quad (4)$$

$$\left(\int_0^{\alpha_c} E(\alpha)(\alpha A + 1) d\alpha - \left(\int_0^{\alpha_c} E(\alpha) d\alpha\right)^2 \Big/ \int_0^{\alpha_c} \frac{E(\alpha)}{\alpha A + 1} d\alpha\right)$$

provided $$A = r_o/r_i - 1 \quad (5)$$

$$I(\alpha_c) = \frac{1}{2A}\left\{1 - \frac{2(1+\alpha_c A)\ln(1+\alpha_c A)}{\alpha_c A(2+\alpha_c A)}\right\} \quad (6)$$

If the equations (1) and (3) are substituted for the equation (4), an approximate solution (7) of the residual stress σ θ ($\alpha_c$) is obtained. The maximum value of σ θ is obtained from this equation:

$$\sigma_\theta = \quad (7)$$

$$\frac{A}{\pi r_i} \sum_{k=0}^{2} c_k \sum_{j=0}^{4} \sum_{i=0}^{j} \left(2\frac{k+i+3}{k+j+1} C_i g_{j-i} A^{j-i} + \sum_{m=0}^{j-i-1}(-1)^{j+i+m} k+i+\right.$$

$$\left.\frac{3}{k+i+m+1} C_i g_m A^{j-i}\right)((k+j+2)\alpha_c^{k+j+1} - 1)$$

provided $$g_0 = \frac{1}{2}, \, g_1 = \frac{1}{6}, \, g_2 = -\frac{5}{36}, \, g_3 = \frac{19}{90}, \, g_4 = -\frac{271}{540}$$

$$C_0 = \frac{1}{12} a_0, \, C_1 = \frac{1}{12}\left(\frac{1}{2} a_1 - a_0 A\right),$$

$$C_2 = \frac{1}{6}\left(-\frac{1}{24} a_0^{-1} a_1^2 + \frac{1}{5} a_2 - \frac{29}{120} a_1 A\right)$$

$$C_3 = \frac{1}{24}\left(\frac{1}{12} a_0^{-2} a_1^3 - \frac{1}{3} a_0^{-1} a_1 a_2 + \frac{7}{10} a_3 + \left(\frac{1}{6} a_0^{-1} a_1^2 - \frac{23}{30} a_2\right) A\right)$$

$$C_4 = -\frac{1}{576} a_0^{-3} a_1^4 + \frac{1}{108} a_0^{-2} a_1^2 a_2 - \frac{1}{80} a_0^{-1} a_1 a_3 +$$

$$\frac{1}{48} a_0^{-1} a_2^2 + \left(-\frac{7}{1728} a_0^{-2} a_1^3 + \frac{2}{135} a_0^{-1} a_1 a_2 + \frac{11}{96} a_3 - \frac{19}{672} a_3\right) A$$

Next, the pipe of the present invention has (B) a crystallinity of 0.630 to 0.850, preferably 0.650 to 0.800. If it is less than 0.630, the pipe not only is reduced in a rigidity but also brings about a reduction in a creep characteristic. On the other hand, if it exceeds 0.850, the breaking time in a slow crack growth test is shortened. In the present invention, the crystallinity is measured by the following method.

Measuring Method for Crystallinity

In the present invention, a crystallinity of the pipe is different depending on the thickness direction, and therefore a crystallinity $X(\alpha)$ (defined in the following equation (8)) of the pipe according to the present invention means that at $\alpha=\frac{2}{3}$ (that is, $X(\frac{2}{3})$). The pipe is equally divided into 6 or more parts in a thickness direction, and the respective small pieces are measured for enthalpy of fusion ΔH by means of DSC-7 (manufactured by Perkin Elmer Co., Ltd.). In DSC measurement, this small piece is put in an aluminum-made pan and maintained at 25° C. for 3 minutes, and then it is heated up to 160° C. at 10° C./minute to carry out the measurement. The ΔH is calculated with a starting point of 35° C. and an end point of 140° C. which are set as base points, and ΔH (J/g) is divided by enthalpy of fusion of 289.5 (J/g) when the crystallinity is 100% to determine the crystallinity $X_c$. The crystallinity thus obtained is used to determine a regression coefficient $b_i$ according to the following regression equation:

$$X(\alpha) = \sum_{i=0}^{3} b_i \alpha^i \quad (8)$$

Next, $\alpha=\frac{2}{3}$ is substituted for the equation described above to determine the crystallinity $X(\frac{2}{3})$.

Further, in the pipe of the present invention, (C) a gradient of the crystallinity against a thickness of the pipe is 0.465 or less, preferably 0.460 or less. If it exceeds 0.465, the creep characteristic is reduced.

In this case, the gradient (absolute value $|dX(\alpha)/d\alpha|$) of the crystallinity of the pipe according to the present invention means that at $\alpha=\frac{2}{3}$. To be specific, a regression coefficient $b_i$ in an equation (9) is determined by the same method as described above. The regression coefficient thus obtained is substituted for the following equation to determine the absolute value of the gradient ($dX(\alpha)/d\alpha$) of the crystallinity:

$$dX(\alpha)/d\alpha|_{\alpha=2/3} = \sum_{i=0}^{3} ib_i(2/3)^{i-1} \tag{9}$$

Further, the pipe of the present invention has (D) a thickness of 5 to 50 mm.

If the thickness is less than 5 mm, it is difficult to control the temperature in cooling, and the whole of the pipe is quickly cooled, so that a life characteristic of the pipe is lowered. On the other hand, if it exceeds 50 mm, the pipe cooling bath is notably lengthened to reduce the workability in molding the pipe.

The pipe of the present invention is required to satisfy the conditions of (A), (B), (C) and (D), and it has a tie molecule-forming probability of preferably 0.12 or more, more preferably 0.13 or more and particularly preferably 0.14 or more. If it is less than 0.12, the breaking time in the slow crack growth is shortened in a certain case.

In this respect, the tie molecule-forming probability P according to the present invention means that at $\alpha=\frac{2}{3}$. P can be determined with reference to Y. L. Huang, N. Brown, J. Polym. Sci., Part B: Polym. Phys., 29, 129 (1991). To be specific, the pipe is equally divided into 6 or more parts in a thickness direction of the pipe, and the respective small pieces are measured for P according to the following equation, wherein Mw is a weight average molecular weight, and Lc and La are a lamella thickness (Å) and an amorphous thickness (Å) respectively.

$$P = \frac{1}{3} \frac{\int_{2Lc+La}^{\infty} r^2 \exp(-1.3125r^2/Mw) dr}{\int_0^{\infty} r^2 \exp(-1.3125r^2/Mw) dr} \tag{10}$$

Mw is determined by gel permeation chromatography (GPC) measurement on the following conditions:

GPC apparatus: Waters 150 CV+
GPC column: Shodex UT-806M (two columns)
Solvent: 1,2,4-trichlorobenzene (TCB)
Measuring temperature: 145° C.
Sample concentration: 0.2% (w/v)
Flow velocity: 1.0 ml/minute
Calibration curve: Universal Calibration
Detector: RI detector The PE (polyethylene)-reduced molecular weight is determined by a Universal Calibration method and analyzed using a GPC-Pro program (Ver. 3.12) of Viscotec Co., Ltd. Mw is determined using the following equation to correct broadening in the molecular weight distribution. Mw=Mw (non-corrected)/Λ (Λ: factor of broadening correction).

The lamella thickness Lc and the amorphous thickness La are obtained by the following equations:

$$Lc(\text{Å}) = 6.26 \times \frac{414}{414 - Tm(K)} \tag{11}$$

$$La(\text{Å}) = Lc(Xc^{-1} - 1) \tag{12}$$

In the melting point Tm and the crystallinity $X_c$, the pipe is equally divided into 6 or more parts in a thickness direction, and the respective small pieces are measured for an enthalpy of fusion ΔH and a melting point Tm by means of DSC-7 (manufactured by Perkin Elmer Co., Ltd.). In DSC measurement, this small piece is put in an aluminum-made pan and maintained at 25° C. for 3 minutes, and then it is heated up to 160° C. at 10° C./minute to measure the melting point Tm. The crystallinity $X_c$ is determined by dividing the ΔH (J/g) by 289.5. The ΔH is determined with a starting point of 35° C. and an end point of 140° C. which are set as base points.

Next, P of each small piece is used to determine a regression coefficient $d_i$ using the following regression equation:

$$P(\alpha) = \sum_{i=0}^{3} d_i \alpha^i \tag{13}$$

Then, $\alpha=\frac{2}{3}$ is substituted for the equation described above to determine the tie molecule-forming probability P ($\frac{2}{3}$).

Further, the pipe of the present invention has a hoop stress $\sigma_{1000}$ of preferably 12.00 MPa or more, particularly suitably 12.10 MPa or more at a breaking time of 1000 hours, wherein a hydrostatic pressure is applied to the pipe at a temperature of 20° C. If it is less than 12.00 MPa, the creep life characteristic is reduced in a certain case.

The hoop stress $\sigma_{1000}$ is determined by carrying out pipe pressure testing according to ISO 1167. That is, a hydrostatic pressure of 2.2 to 3.0 MPa is applied to the pipe in constant temperature water of 20° C. by means of a pipe pressure tester manufactured by Daiichi Science Co., Ltd. to determine the breaking time. The following equation is used to calculate the hoop stress σ from the maximum mean outside diameter $D_{m,max}$, the minimum wall thickness $e_{min}$ and the applied internal pressure P. The maximum mean outside diameter and the minimum wall thickness are determined according to ISO 3126-1974 (E).

$$\sigma = \frac{P(D_{m,max} - e_{min})}{2e_{min}} \tag{14}$$

The hoop stress σ in a breaking time of 100 to 3000 hours is measured at least at 6 points. In this case, it is measured at 2 or more points within a breaking time of 500 to 1000 hours and at one or more points at a breaking time of 1000 hours or longer. These data are used to determine a regression coefficient $e_i$ from the following regression equation. The regression equation (15) is used to calculate the hoop stress $\sigma_{1000}$ (MPa) at a breaking time of 1000 hours:

$$\log\sigma = \sum_{i=0}^{2} e_i (\log t)^i \tag{15}$$

In the pipe of the present invention, a breaking time of the pipe measured according to slow crack growth measurement ISO 13479 is preferably a prescribed value or more. That is, the pipe is provided on a surface thereof with 4 notches (notch depth rate: 20%) and has preferably a breaking time of 165 hours or longer which is measured at a temperature of 80° C. under a pressure of 0.92 MPa, and the pipe having a notch depth rate of 40% has preferably a breaking time of 20 hours or longer. The pipe having a notch depth rate of 40% has a breaking time of more preferably 50 hours or longer, further preferably 80 hours or longer and particularly preferably 100 hours or longer. In the case described above, if the breaking time is shorter than the preferred range, that is, if the breaking time at a notch depth rate of 20% is shorter than 165 hours or if the breaking time at a notch depth rate of 40% is shorter than 20 hours, the pipe is liable to crack due to an internal pressure of the pipe if the pipe is scratched on a surface. In this case, the notch depth rate (Ur) is a rate of the notch depth to the pipe thickness and can be determined according to the following equation:

$$Ur=[1-(\text{pipe thickness/notch depth})]\times 100\ (\%)$$

A breaking time of the pipe is measured by the following specific method according to slow crack growth measurement ISO 13479. That is, the pipe is provided on a surface thereof with 4 notches (an angle of the notch is 60° and a positional relation of 4 notches is 90°). The notch depth rate (Ur) to the pipe thickness is prescribed as 20%. In general, an ethylene base copolymer-made pipe is liable to be scratched and can not be a reference in the above measuring method when the pipe is deeply scratched. The reasons therefor include that the pipe is susceptible to brittle fracture when a notch depth rate is small, and the pipe is susceptible to ductile fracture when a notch depth rate is large; as a result thereof, the pipe in which the ethylene base copolymer has a lower density has a longer breaking time at a notch depth rate of 20% and a shorter breaking time at a notch depth rate of 40%; the pipe in which the ethylene base copolymer has a higher density has a shorter breaking time at a notch depth rate of 20% and a longer breaking time at a notch depth rate of 40%.

Because of the reasons described above, a long-term pressure tightness of the pipe which is scratched on a surface is determined as the breaking time at a notch depth rate of 20% and a notch depth rate of 40%. The breaking time is determined by applying a hydrostatic pressure of 0.92 MPa in constant temperature water having a temperature of 80° C. by means of a pipe pressure tester manufactured by Daiichi Science Co., Ltd. to detect a breaking time of the pipe. The measurement is carried out for the pipe having a notch depth rate of 15 to 30% at two or more points and the pipe having a notch depth rate of 30 to 45% at two or more points, and the following regression equation is used to calculate regression coefficients a and b from the notch depth rates Ur (%) at total four or more points and the breaking time t (hours). The breaking times at a notch depth rate of 20% and a notch depth rate of 40% are calculated from a regression equation obtained by substituting the calculated regression coefficients for the following regression equation:

$$\log t = a\log Ur + b$$

The pipe of the present invention comprises an ethylene base polymer and has the properties described above. In this respect, the ethylene base polymer according to the present invention which is a raw material comprises ethylene and an α-olefin having 3 to 20 carbon atoms. In this case, the α-olefin shall not specifically be restricted as long as it is an α-olefin having 3 to 12 carbon atoms, and it is preferably a linear or branched α-olefin having 3 to 8 carbon atoms. To be specific, it includes propylene, butene-1, pentene-1, hexene-1, octene-1 and 4-methyl-1-pentene.

A melt index (MI) of the ethylene base polymer according to the present invention may suitably be selected according to the situation, and it is preferably 0.02 to 0.18 g/10 minutes, particularly preferably 0.04 to 0.15 g/10 minutes. If the MI is less than 0.02 g/10 minutes, the fluidity and the processability are unsatisfactory in a certain case. On the other hand, if it exceeds 0.18 g/10 minutes, the impact resistance is likely to be reduced. In this respect, the MI is a value obtained by converting an extruding amount determined at a temperature of 190° C. and a load of 21.18N to an extruding amount per 10 minutes according to JIS K7210.

Further, a complex viscosity coefficient η* of the ethylene base polymer according to the present invention at 190° C. and a frequency of 100 sec$^{-1}$ is preferably $1\times10^3$ to $4\times10^3$ Pa·sec, particularly suitably $1.2\times10^3$ to $3\times10^3$ Pa·sec. If it is less than $1\times10^3$ Pa·sec, the impact resistance is lowered, and if it exceeds $4\times10^3$ Pa·sec, the processability is reduced. In this respect, the complex viscosity coefficient can be measured by means of a rotary rheometer.

The ethylene base polymer used in the present invention can be obtained by copolymerizing ethylene with an α-olefin having 3 to 20 carbon atoms using a Ziegler catalyst or a metallocene catalyst. The typical polymerization method includes a slurry method, a vapor phase method and a solution method, but the ethylene base polymer used in the present invention shall not be restricted by the polymerization catalyst and the polymerization method therefor. To be specific, a method described in Japanese Patent Application Laid-Open No. 228635/1999 can be given.

Further, the ethylene base copolymer used in the present invention may be either a single ethylene copolymer or a composition obtained by blending two or more kinds of ethylene copolymers as long as the object of the present invention is not damaged. Also, it can be produced as well by multistage polymerization. Thus, it shall not be restricted by the blending method. When it is produced by blending, it can be produced by mixing a pelletized or powdered ethylene homopolymer or ethylene base copolymer by means of a single shaft extruding machine or a dual shaft extruding machine. A powdered ethylene homopolymer or ethylene base copolymer is preferably used. It is produced more preferably by a multistage polymerization method. When the polymer comprising an ethylene homopolymer and an ethylene base copolymer is produced by a two-stage continuous polymerization method, a polymerization amount ratio of the ethylene homopolymer to the ethylene base copolymer is preferably 1:0.7 to 1:1.2, more preferably 1:0.75 to 1:1.0. If it is less than 1:0.7, the impact resistance is lowered, and therefore it is not preferred. On the other hand, if it exceeds 1:1.2, the fluidity is reduced.

The pipe of the present invention is produced from the ethylene base polymer described above, and it can usually be produced by a method in which the ethylene base polymer is extruded and molded at a higher temperature than a melting point thereof. In this connection, the polymer has to be molded so that (A) a maximum value of the residual stress is 0.13 MPa or less; (B) the crystallinity is 0.630 to 0.850; (C) a gradient of the crystallinity against a thickness of the pipe is 0.465 or less; and (D) the pipe has a thickness of 5 to 50 mm. The pipe has preferably a tie molecule-forming probability of 0.12 or more.

It is essential for producing the pipe according to the present invention to suitably select the molding conditions according to the kind of an extruding machine and the resin and pay attentions so that the requisites (A) to (D) described above are always satisfied. The molding conditions satisfying the requisites (A) to (D) described above include, for example, the conditions of a resin temperature of 220 to 250° C., particularly preferably 225 to 250° C. and a cooling temperature of 5 to 25° C., particularly preferably 5 to 15° C.

Further, in the present invention, additives usually used for ethylene base polymers, for example, antioxidants, neutralizing agents and pigments can be added as well in advance. Pigments such as a phthalocyanine base, a cobalt blue base and ultramarine can be used as a blue pigment, and carbon black can be used as a black pigment.

The present invention shall more specifically be explained below with reference to examples, but the present invention shall not be restricted to these examples.

EXAMPLE 1

(1) Ethylene Base Polymer (Production of Ethylene-butene-1 Copolymer)

① A reactor (content volume: 5 liters) equipped with a stirrer for a solid matter was sufficiently substituted with nitrogen gas and then charged with 80 g of metal magnesium, 1,210 g of ethanol and one g of iodine, and they were reacted on a refluxing condition until hydrogen gas was not observed to be generated from the system to obtain a solid product. This solid product was crushed in a stainless steel-made ball mill for 10 hours to obtain a solid matter.

② Preparation of Solid Catalyst Component

A reactor (content volume: 5 liters) equipped with a stirrer which was sufficiently substituted with nitrogen gas was charged with 150 g of the solid matter obtained above and 350 ml of dehydrated hexane and further charged with 38 ml of silicon tetrachloride and 38 ml of ethanol while stirring to react them at 70° C. for 2 hours. Then, 200 ml of titanium tetrachloride was added and reacted at 70° C. for 6 hours, and then it was washed with hexane to obtain a solid catalyst component.

③ Production of Ethylene Base Copolymer

A polymerization apparatus having a content volume of 200 liters equipped with a stirrer was continuously fed with 6.0 kg/hr of ethylene, 17 liter/hr of hexane and 50 liter/hr of hydrogen and charged with the solid catalyst component described above at a rate of 0.9 millimole/hr in terms of a titanium atom, triethylaluminum at a rate of 2.4 millimole/hr and diethylaluminum chloride at a rate of 27.3 millimole/hr, and the polymerization was continuously carried out on the conditions of a polymerization temperature of 80° C., a polymerization pressure (total pressure) of 0.41 MpaG and a residence time of 3.5 hours (first step polymerization).

A suspension of hexane containing the resulting polyethylene was introduced into a hydrogen deaeration bath at the same temperature to separate hydrogen, and then the whole amount was introduced as it was into a polymerization reactor of a second step.

Second Step Polymerization

The polymerization reactor of the second step was fed with ethylene at a rate of 4.8 kg/hr, hexane at a rate of 13 liter/hr, butene-1 at a rate of 270 g/hr and hydrogen at a rate of 0.3 liter/hr, and the polymerization was continuously carried out at 80° C. on the conditions of a total pressure of 0.25 MpaG and a residence time of 2.4 hours to obtain an ethylene base copolymer (ethylene-butene-1 copolymer).

(2) The ethylene-butene-1 copolymer obtained in (1) described above having an MI of 0.06 g/10 minutes, a density of 952 kg/m$^3$ and a complex viscosity coefficient of 2.3×10$^3$ Pa·sec was used to mold a pipe having a outside diameter of 63 mm$\phi$ and a thickness of 5.8 mm on the following molding conditions using a pipe molding machine manufactured by Reiphenfoizer Co., Ltd., a spiral type dice, a vacuum type cooling water bath, an atmospheric pressure type cooling bath and a pipe-drawing machine, wherein set were the drawing speed to 6.2 m/minute, the discharge amount to 397 kg/hour, the resin temperature to 220° C. and a cooling water temperature of the pipe to 20° C.

(3) Slow Crack Growth-breaking Time

It was measured according to slow crack growth measurement ISO 13479. That is, the pipe is provided on a surface thereof with 4 notches, and a pipe pressure testing was carried out at a temperature of 80° C. and a pressure of 0.92 MPa to determine a breaking time of the pipe. In this case, the pipe outside diameter is 63 mm$\phi$; an angle of the notch is 60°; and a positional distance of the four notches is 90°. Then, the notch depth rate Ur defined by the following equation was determined:

$$Ur=[1-(\text{pipe thickness/notch depth})]\times 100 \ (\%)$$

As described above, the following regression equation was used to calculate the regression coefficient from the notch depth rate Ur (%) and the breaking time t (hours), and the breaking times at notch depth rates of 20% and 40% were calculated from the regression equation obtained:

$$\log t = a\log Ur + b$$

(4) Maximum Value of Residual Stress of the Pipe

The pipe was cut to a length of 5 mm to prepare annulus rings having different outside diameters by removing an external layer thereof, that is, the annulus rings of 63 mm$\phi$×51 mm$\phi$, 61 mm$\phi$×51 mm$\phi$, 59 mm$\phi$×51 mm$\phi$, 57 mm$\phi$×51 mm$\phi$, 55 mm$\phi$×51 mm$\phi$ and 53 mm$\phi$×51 mm$\phi$ (outside diameter×inside diameter). Then, each annulus ring was cut in a pipe length direction by means of a razor. The each other's cut faces were shifted, and then a gap displacement δ (m) in an axis of the annulus ring after 216 hours was measured. The gap displacement δ was used to determine a regression coefficient $c_k$ in the equation (1) by a least square method.

On the other hand, the pipe was equally divided into 8 parts in a thickness direction, and the respective small pieces were measured for an enthalpy of fusion ΔH by means of DSC-7 (manufactured by Perkin Elmer Co., Ltd.). In DSC measurement, this small piece was put in an aluminum-made pan and maintained at 25° C. for 3 minutes, and then it was heated up to 160° C. at 10° C./minute to carry out the measurement. The ΔH was calculated with a starting point of 35° C. and an end point of 140° C. which were set as base points, and ΔH (J/g) was divided by an enthalpy of fusion of 289.5 (J/g) when the crystallinity was 100% to determine the crystallinity $X_c$. The equation (2) was used to determine the tensile creep elastic modulus E after 216 hours (time t=216 hours).

The tensile creep elastic modulus E of each small piece obtained by using the equation described above is used to determine a regression coefficient $a_i$ in the equation (3) by a least square method. The regression coefficients $c_k$ and $a_i$ in the equations (1) and (3) were substituted for the equation (7) to determine the residual stress σ θ in a circumferential direction. The maximum value was determined from the σ θ (α) obtained.

In respect to the breaking time at a breaking stress of 12.00 MPa, the regression equation (15) was used to calculate the breaking time at a hoop stress of 12.00 MPa. Further, in respect to the breaking time at a breaking stress of 11.00 MPa, the regression equation (15) was used to calculate the breaking time at a hoop stress of 11.00 MPa.

(5) Method for Measuring the Crystallinity and the Gradient Thereof

The pipe was equally divided into 8 parts in a thickness direction, and the respective small pieces were measured for an enthalpy of fusion ΔH by means of DSC-7 (manufactured by Perkin Elmer Co., Ltd.). In DSC measurement, this small piece was put in an aluminum-made pan and maintained at 25° C. for 3 minutes, and then it was heated up to 160° C. at 10° C./minute to carry out the measurement. The ΔH was calculated with a starting point of 35° C. and an end point of 140° C. which were set as base points, and ΔH (J/g) was divided by an enthalpy of fusion of 289.5 (J/g) when the crystallinity is 100% to determine the crystallinity $X_c$. The crystallinity thus obtained was used to determine the regression coefficient $b_i$ according to the regression equation (8).

Then, the equations (8) and (9) were used to determine the crystallinity (⅔) at α=⅔ and the gradient thereof.

(6) Method for Measuring the Resin Characteristics (A) Melt Index (MI (g/10 Minutes))

It was measured at a temperature of 190° C. and a load of 21.18N according to JIS K7210.

(B) Complex Viscosity Coefficient

A sample which was compression molded was interposed between discs to measure a complex viscosity coefficient η* on the conditions of 190° C. and a frequency of 100 sec$^{-1}$ by means of a rotary rheometer (ARES manufactured by Rheometric Science Co., Ltd.). A gap between the discs was set to 1.0 to 2.0 mm, and the strain was set to 15%.

(C) Density

The sample (strand having a length of 5 to 6 cm) described above after measuring the melt index was put in a constant temperature oil bath of 120° C. and maintained for one hour. After maintaining for one hour, the sample was cooled down at a constant rate from 120° C. to a room temperature in one hour. Next, after leaving the sample standing at 23° C., two small pieces (test pieces) were cut out from the above sample, and the cut test pieces were wetted with methanol. Then, they were put slowly into a density gradient tube. After 30 minutes passed, an average value in the positions of the test pieces was determined. This average value was converted to a density from the position of the sample according to a calibration curve of a density and a scale in the density gradient tube, which was prepared using a standard float, to thereby determine the density.

Figure 2:
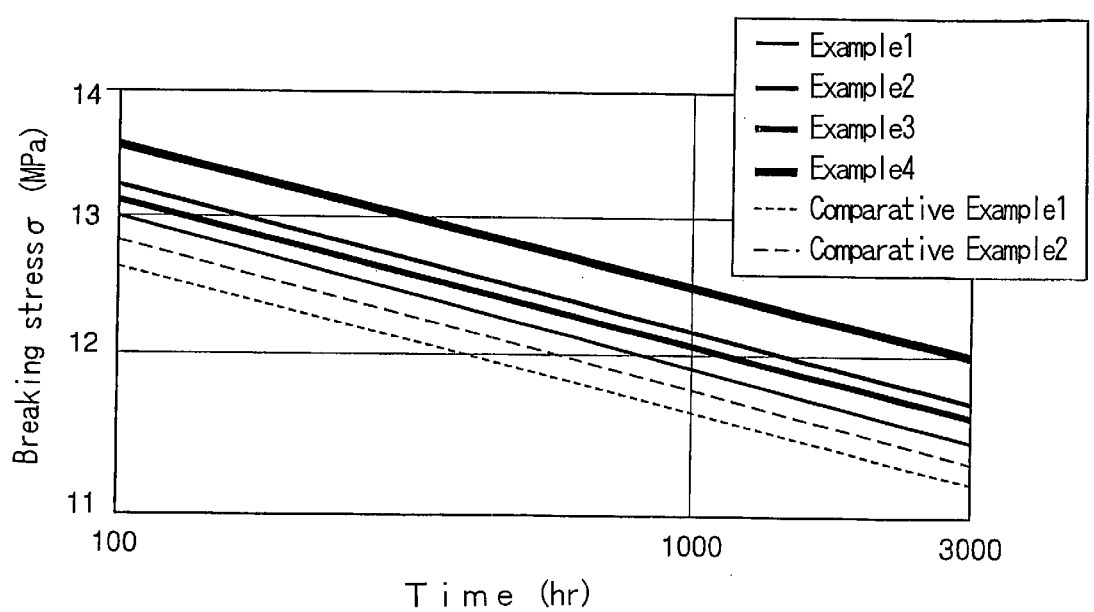
FIG. 2 is a drawing showing a relation of a breaking stress to a breaking time in the pipes obtained in the examples and the comparative examples.

The results thereof are shown in Table 1. Further, the relation of a breaking time and a breaking stress of the pipe is shown in FIG. 2.

EXAMPLE 2

The same ethylene base polymer and the same kind of the molding machine as in Example 1 were used to mold a pipe having an outside diameter of 63 mmφ and a thickness of 5.8 mm, wherein set were the drawing speed to 6.2 m/minute, the discharge amount to 397 kg/hour, the resin temperature to 220° C. and a cooling water temperature of the pipe to 11° C.

The pipe thus obtained was subjected to the same measurements as in Example 1. The results thereof are shown in Table 1. Further, the relation of a breaking time and a breaking stress of the pipe is shown in FIG. 2.

EXAMPLE 3

The same ethylene base polymer and the same kind of the molding machine as in Example 1 were used to mold a pipe having an outside diameter of 63 mmφ and a thickness of 5.8 mm, wherein set were the drawing speed to 6.2 m/minute, the discharge amount to 397 kg/hour, the resin temperature to 233° C. and a cooling water temperature of the pipe to 20° C.

The pipe thus obtained was subjected to the same measurements as in Example 1. The results thereof are shown in Table 1. Further, the relation of a breaking time and a breaking stress of the pipe is shown in FIG. 2.

EXAMPLE 4

The same ethylene base polymer and the same kind of the molding machine as in Example 1 were used to mold a pipe having an outside diameter of 63 mmφ and a thickness of 5.8 mm, wherein set were the drawing speed to 6.2 m/minute, the discharge amount to 397 kg/hour, the resin temperature to 233° C. and a cooling water temperature of the pipe to 6° C.

The pipe thus obtained was subjected to the same measurements as in Example 1. The results thereof are shown in Table 1. Further, the relation of a breaking time and a breaking stress of the pipe is shown in FIG. 2.

COMPARATIVE EXAMPLE 1

The same ethylene base polymer and the same kind of the molding machine as in Example 1 were used to mold a pipe having an outside diameter of 63 mmφ and a thickness of 5.8 mm, wherein set were the drawing speed to 6.2 m/minute, the discharge amount to 397 kg/hour, the resin temperature to 215° C. and a cooling water temperature of the pipe to 20° C.

The pipe thus obtained was subjected to the same measurements as in Example 1. The results thereof are shown in Table 1. Further, the relation of a breaking time and a breaking stress of the pipe is shown in FIG. 2.

COMPARATIVE EXAMPLE 2

The same ethylene base polymer and the same kind of the molding machine as in Example 1 were used to mold a pipe having an outside diameter of 63 mmφ and a thickness of 5.8 mm, wherein set were the drawing speed to 7.4 m/minute, the discharge amount to 472 kg/hour, the resin temperature to 221° C. and a cooling water temperature of the pipe to 20° C.

The pipe thus obtained was subjected to the same measurements as in Example 1. The results thereof are shown in Table 1. Further, the relation of a breaking time and a breaking stress of the pipe is shown in FIG. 2.

TABLE 1

| | Example | | | |
|---|---|---|---|---|
| Items | 1 | 2 | 3 | 4 |
| Residual stress (MPa) | 0.09 | 0.08 | 0.08 | 0.06 |
| Crystallinity (α = ⅔) | 0.663 | 0.665 | 0.665 | 0.664 |
| Gradient of crystallinity (α = ⅔) | 0.444 | 0.419 | 0.456 | 0.435 |
| Pipe thickness (mm) | 5.8 | 5.8 | 5.8 | 5.8 |
| Tie molecule-forming probability | 0.144 | 0.159 | 0.136 | 0.151 |
| MI (g/10 minutes) | 0.06 | 0.06 | 0.06 | 0.06 |
| Density (kg/cm$^3$) | 952 | 952 | 952 | 952 |
| σ$_{1000}$ (MPa) | 12.20 | 12.20 | 12.11 | 12.50 |
| Breaking time (hr) at a breaking stress of 12.00 Mpa | 900 | 1570 | 1300 | 3070 |
| Forecasted breaking time (hr) at a breaking stress of 11.00 Mpa | 9600 | 17200 | 14100 | 33570 |
| Slow crack growth-breaking time (hr) at a notch depth rate of 20% | 3220 | 3180 | 3310 | 4160 |
| Slow crack growth-breaking time (hr) at a notch depth rate of 40% | 160 | 120 | 90 | 190 |

TABLE 2

| | Comparative Example | |
|---|---|---|
| Items | 1 | 2 |
| Residual stress (MPa) | 0.07 | 0.16 |
| Crystallinity ($\alpha = 2/3$) | 0.669 | 0.676 |
| Gradient of crystallinity ($\alpha = 2/3$) | 0.471 | 0.369 |
| Pipe thickness (mm) | 5.8 | 5.8 |
| Tie molecule-forming probability | 0.156 | 0.140 |
| MI (g/10 minutes) | 0.06 | 0.06 |
| Density (kg/cm$^3$) | 952 | 952 |
| $\sigma_{1000}$ (MPa) | 11.66 | 11.81 |
| Breaking time (hr) at a breaking stress of 12.00 MPa | 450 | 630 |
| Forecasted breaking time (hr) at a breaking stress of 11.00 MPa | 4900 | 7000 |
| Slow crack growth-breaking time (hr) at a notch depth rate of 20% | 2130 | 120 |
| Slow crack growth-breaking time (hr) at a notch depth rate of 40% | 50 | 2 |

An outside diameter and an inside diameter of the pipe are fixed in Examples 1 to 4 and Comparative Examples 1 and 2, and therefore the internal pressure P is univocally decided by the breaking stress σ in the equation (14). Accordingly, a breaking time of the pipe under a fixed internal pressure is shown in FIG. 2. A large difference is apparently observed between the examples and the comparative examples.

Further, the same resins are used in Examples 2 and 3 and Comparative Example 1 and in Example 1 and Comparative Example 2, and the production process thereof looks similar. As a result thereof, it is usually considered that a large difference shall not be present between the performances of the pipes produced. As shown in Table 1 and FIG. 2, however, it is truly surprising that the pipes produced in the examples have a markedly long life.

Industrial Applicability

The pipe according to the present invention is excellent in a durability, a rigidity and an impact resistance and suited to uses for large diameter pipes receiving a high internal pressure.

What is claimed is:

1. A pipe comprising an ethylene base polymer comprising ethylene and an α-olefin having 3 to 20 carbon atoms, wherein (A) a maximum value of the residual stress is 0.13 MPa or less; (B) the crystallinity is 0.630 to 0.850; (C) a gradient of the crystallinity against a thickness of the pipe is 0.465 or less; and (D) the pipe has a thickness of 5 to 50 mm.

2. The pipe as described in claim 1, wherein the pipe has a tie molecule-forming probability of 0.12 or more.

3. The pipe as described in claim 1, wherein the ethylene base polymer has a melt index of 0.02 to 0.18 g/10 minutes and a complex viscosity coefficient of 1×10$^3$ to 4×10$^3$ Pa·sec at a frequency of 100 sec$^{-1}$.

4. The pipe as described in claim 1, wherein the hoop stress which is determined by applying a hydrostatic pressure to the pipe at a temperature of 20° C. is 12.00 MPa or more at a breaking time of 1000 hours.

5. The pipe as described in claim 1, wherein according to ISO 13479, the pipe is provided on a surface thereof with 4 notches (notch depth rate: 20%) and has a breaking time of 165 hours or longer which is measured at a temperature of 80° C. under a pressure of 0.92 MPa, and the pipe having a notch depth rate of 40% has a breaking time of 20 hours or longer.

6. The pipe as described in claim 1, wherein (A) a maximum value of the residual stress is 0.11 MPa or less; (B) the crystallinity is 0.650 to 0.800; and (C) a gradient of the crystallinity against a thickness of the pipe is 0.460 or less.

7. The pipe as described in claim 1, wherein the pipe has a tie molecule-forming probability of 0.14 or more.

8. The pipe as described in claim 1, wherein the ethylene base polymer has a melt index of 0.04 to 0.15 g/10 minutes and a complex viscosity coefficient of 1×10$^3$ to 4×10$^3$ Pa·sec at a frequency of 100 sec$^{-1}$.

9. The pipe as described in claim 1, wherein the hoop stress which is determined by applying a hydrostatic pressure to the pipe at a temperature of 20° C. is 12.10 MPa or more at a breaking time of 1000 hours.

10. The pipe as described in claim 1, wherein according to ISO 13479, the pipe is provided on a surface thereof with 4 notches (notch depth rate: 20%) and has a breaking time of 165 hours or longer which is measured at a temperature of 80° C. under a pressure of 0.92 MPa, and the pipe having a notch depth rate of 40% has a breaking time of 50 hours or longer.

11. The pipe as described in claim 1, wherein according to ISO 13479, the pipe is provided on a surface thereof with 4 notches (notch depth rate: 20%) and has a breaking time of 165 hours or longer which is measured at a temperature of 80° C. under a pressure of 0.92 MPa, and the pipe having a notch depth rate of 40% has a breaking time of 80 hours or longer.

12. The pipe as described in claim 1, wherein according to ISO 13479, the pipe is provided on a surface thereof with 4 notches (notch depth rate: 20%) and has a breaking time of 165 hours or longer which is measured at a temperature of 80° C. under a pressure of 0.92 MPa, and the pipe having a notch depth rate of 40% has a breaking time of 100 hours or longer.

13. The pipe as described in claim 1, wherein the ethylene base polymer has a melt index of 0.02 to 0.18 g/10 minutes and a complex viscosity coefficient of 1.2×10$^3$ to 3×10$^3$ Pa·sec at a frequency of 100 sec$^{-1}$.

14. The pipe as described in claim 1, wherein the ethylene base polymer has a melt index of 0.04 to 0.15 g/10 minutes and a complex viscosity coefficient of 1.2×10$^3$ to 3×10$^3$ Pa·sec at a frequency of 100 sec$^{-1}$.

* * * * *